(12) United States Patent
Yang

(10) Patent No.: US 12,046,965 B2
(45) Date of Patent: Jul. 23, 2024

(54) IN-WHEEL WORKING DEVICE AND AUTOMOBILE INCLUDING THE SAME

(71) Applicant: HYUNDAI MOBIS CO., LTD., Seoul (KR)

(72) Inventor: Hae Jun Yang, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 603 days.

(21) Appl. No.: 17/314,622

(22) Filed: May 7, 2021

(65) Prior Publication Data

US 2021/0351679 A1    Nov. 11, 2021

(30) Foreign Application Priority Data

May 8, 2020  (KR) .................. 10-2020-0055168

(51) Int. Cl.
| | | |
|---|---|---|
| *F16C 19/18* | (2006.01) | |
| *B60B 27/00* | (2006.01) | |
| *B60K 7/00* | (2006.01) | |
| *F16C 41/00* | (2006.01) | |
| *G01P 3/44* | (2006.01) | |
| *H02K 7/00* | (2006.01) | |

(Continued)

(52) U.S. Cl.
CPC ......... *H02K 24/00* (2013.01); *B60B 27/0005* (2013.01); *B60B 27/0015* (2013.01); *B60B 27/0068* (2013.01); *B60B 27/0094* (2013.01); *B60K 7/0007* (2013.01); *F16C 19/186* (2013.01); *F16C 41/007* (2013.01); *G01P 3/443* (2013.01); *H02K 7/006* (2013.01); *H02K 11/225* (2016.01); *H02K 2211/03* (2013.01)

(58) Field of Classification Search
CPC ............ B60B 27/0005; B60B 27/0015; B60B 27/0068; B60B 27/0094; B60K 7/0007; F16C 19/186; F16C 41/007; F16C 2326/02; H02K 7/006; H02K 11/225; H02K 2211/03; H02K 24/00; G01P 3/443; G01P 3/446
See application file for complete search history.

(56) References Cited

U.S. PATENT DOCUMENTS

| | | | |
|---|---|---|---|
| 10,473,487 B2 * | 11/2019 | Kegeler | ................. G01P 3/42 |
| 2015/0300412 A1 * | 10/2015 | Kegeler | ................. F16C 33/80 |
| | | | 384/448 |
| 2017/0152894 A1 * | 6/2017 | Kegeler | ................. H05K 3/46 |

FOREIGN PATENT DOCUMENTS

| | | | | |
|---|---|---|---|---|
| DE | 102017103414 B3 * | 2/2018 | ............ | F16C 33/586 |
| JP | 2003278778 A  * | 10/2003 | | |
| JP | 2011149517 A  * | 8/2011 | ............ | F16C 41/007 |

OTHER PUBLICATIONS

JP2011149517A_Description.*

* cited by examiner

*Primary Examiner* — Phillip A Johnson
(74) *Attorney, Agent, or Firm* — MORGAN, LEWIS & BOCKIUS LLP

(57) ABSTRACT

Disclosed are an in-wheel working device and an automobile including the in-wheel working device. According to one aspect of the present disclosure, provided is an in-wheel working device including a rotation detection sensor coupled to a wheel bearing. The rotation detection sensor includes: a sensor stator coupled to an outer race of the wheel bearing; and a sensor rotor coupled to a hub of the wheel bearing. The sensor stator includes a printed circuit board (PCB) substrate having a surface on which a coil pattern made of a metal material is formed.

12 Claims, 7 Drawing Sheets

(51) Int. Cl.
*H02K 11/225* (2016.01)
*H02K 24/00* (2006.01)

IN-WHEEL WORKING DEVICE AND AUTOMOBILE INCLUDING THE SAME

CROSS-REFERENCE TO RELATED APPLICATION(S)

This application claims priority from and the benefit of Korean Patent Application No. 10-2020-0055168, filed on May 8, 2020, which is hereby incorporated by reference for all purposes as if set forth herein.

TECHNICAL FIELD

Exemplary embodiments relate to an in-wheel working device and an automobile including the in-wheel working device.

BACKGROUND

Recently, in order to prevent environmental pollution caused by internal combustion engines according to the related art and unstable supply and demand of fuel due to internal and external political situations, research and production on electric automobiles which are operated by driving a motor using electric energy have been actively conducted. However, such an electric automobile may be classified into a pure electric automobile in which a motor is driven by a battery storing electric energy, a solar cell automobile in which a motor is drive by using a photoelectric cell, a fuel cell automobile in which a motor is driven by using a fuel cell, and the like.

An in-wheel working device having a structure, in which a motor is mounted inside a wheel of the automobile, is used in the electric automobile.

Also, according to the related art, a resolver sensor is additionally installed to precisely control a motor mounted to the in-wheel working device.

The resolver sensor is constituted by a resolver stator and a resolver rotor, and according to the related art, the resolver stator has a structure in which an excitation coil and an output coil are attached to a steel sheet. In this case, however, due to the volume and weight occupied by coils constituting the excitation coil and the output coil, the volume and weight of the resolver sensor becomes increased.

SUMMARY

Exemplary embodiments of the present disclosure is to facilitate a package configuration of an in-wheel working device of an automobile by reducing volume and weight occupied by a sensor mounted to control a motor in the in-wheel working device.

A first exemplary embodiment of the present disclosure provides an in-wheel working device including: a wheel bearing including a hub that constitutes a body; and a rotation detection sensor coupled to the wheel bearing, wherein the wheel bearing includes: an inner race coupled to an outer circumferential surface of the hub in a radial direction (R); an outer race spaced outward from the inner race in the radial direction (R); and a rolling body provided between the inner race and the outer race or between the hub and the outer race, wherein the rotation detection sensor includes: a sensor stator coupled to the outer race; and a sensor rotor coupled to the hub, wherein the sensor stator includes a printed circuit board (PCB) substrate having a surface on which a coil pattern made of a metal material is formed.

The sensor stator and the sensor rotor may be spaced apart from each other in an axial direction (A) of the hub.

The coil pattern may include a plurality of line segment patterns extending in a radial direction of the PCB substrate.

The coil pattern may include a pattern repeated in a circumferential direction of the PCB substrate.

The sensor stator may further include a stator housing configured to accommodate the PCB substrate of the sensor stator.

The sensor rotor may include: a PCB substrate; and a metal layer which is attached to a surface of the PCB substrate, which faces the sensor stator, among both surfaces of the PCB substrate provided in the sensor rotor.

The sensor rotor may include a metal plate, and protrusion areas protruding in a radial direction of the metal plate and recess areas concavely recessed in the radial direction of the metal plate may be alternately provided in an outer circumferential surface of the metal plate in the radial direction.

The metal layer may be attached to a portion of the surface of the PCB substrate, which faces the sensor stator, among both the surfaces of the PCB substrate provided in the sensor rotor.

The sensor rotor may further include a rotor housing configured to accommodate the PCB substrate provided in the sensor rotor.

The metal plate may be made of an electrical steel sheet or aluminum.

A recess portion having a concavely recessed shape may be formed in a surface of the stator housing on the opposite side from a surface of the stator housing facing the sensor rotor among both surfaces of the stator housing, and the PCB substrate provided in the sensor stator may be accommodated in the recess portion.

A recess portion having a concavely recessed shape may be formed in a surface of the rotor housing facing the sensor stator among both surfaces of the rotor housing, and the PCB substrate provided in the sensor rotor may be accommodated in the recess portion.

A second exemplary embodiment of the present disclosure provides an automobile including the in-wheel working device.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION

Hereinafter, an in-wheel working device and an automobile including the in-wheel working device according to the present disclosure will be described with reference to the drawings.

In-Wheel Working Device

Figure 1:
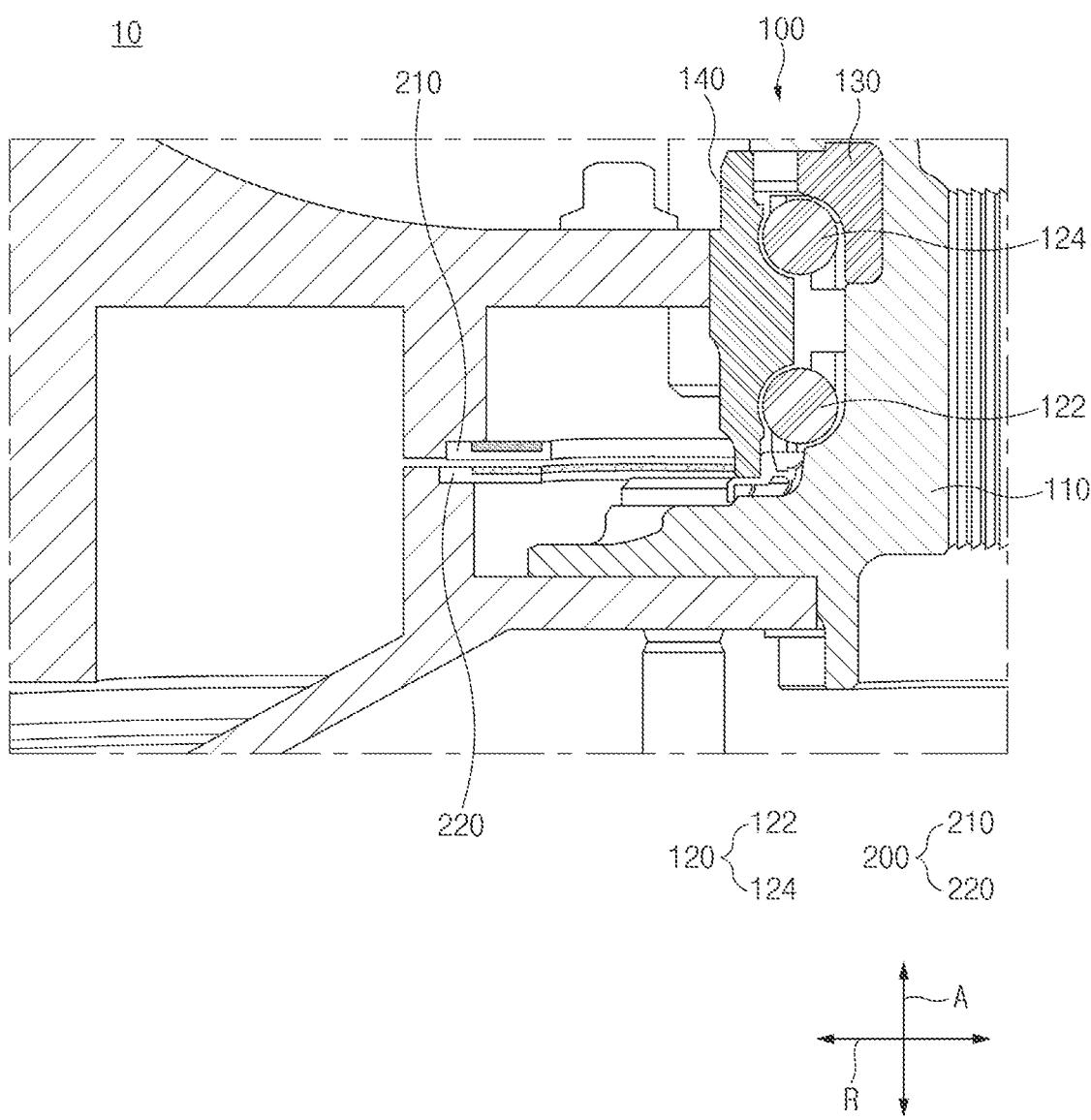
FIG. 1 is a cross-sectional view illustrating a structure of an in-wheel working device according to the present disclosure.

FIG. 1 is a cross-sectional view illustrating a structure of an in-wheel working device according to the present disclosure.

As illustrated in FIG. 1, an in-wheel working device 10 according to the present disclosure may include a wheel bearing 100. The wheel bearing 100 may be a component for enabling smooth rotation of a wheel of an automobile having the in-wheel working device 10 mounted thereto when the automobile is driven, supporting the weight of the automobile, and reducing friction generated in the wheel of the automobile.

The wheel bearing 100 may include a hub 110 constituting a body of the wheel bearing 100. Here, the hub 110 constitutes the body of the wheel bearing 100, and this may be understood as that the hub 110 occupies the largest volume in the wheel bearing 100 of the in-wheel working device 10 according to the present disclosure.

Also, the in-wheel working device 10 according to the present disclosure may include a rotation detection sensor 200. The rotation detection sensor 200 may be a component for controlling driving of a motor mounted to the in-wheel working device 10. That is, the rotation detection sensor 200 may be a component for sensing an operation of the motor and sending a signal about the operation to the outside. In particular, the rotation detection sensor 200 may be a component for replacing a function of a resolver sensor according to the related art.

The wheel bearing 100 may include a hub 110, an inner race 130 coupled to an outer circumferential surface of the in-wheel working device 10 in a radial direction R, an outer race 140 spaced outward from the inner race 130 in the radial direction R, and a rolling body 120 provided between the inner race 130 and the outer race 140 or between the hub 110 and the outer race 140. In FIG. 1, a first rolling body 122 provided between the hub 110 and the outer race 140 and a second rolling body 124 spaced apart from the first rolling body 122 in an axial direction A of the hub 110 and provided between the inner race 130 and the outer race 140 are illustrated as one example of the present disclosure. Here, the outer race 140 may be integrally formed as illustrated in FIG. 1, but the outer race 140 may be made of an assembly of a plurality of component separated from each other.

Figure 2:
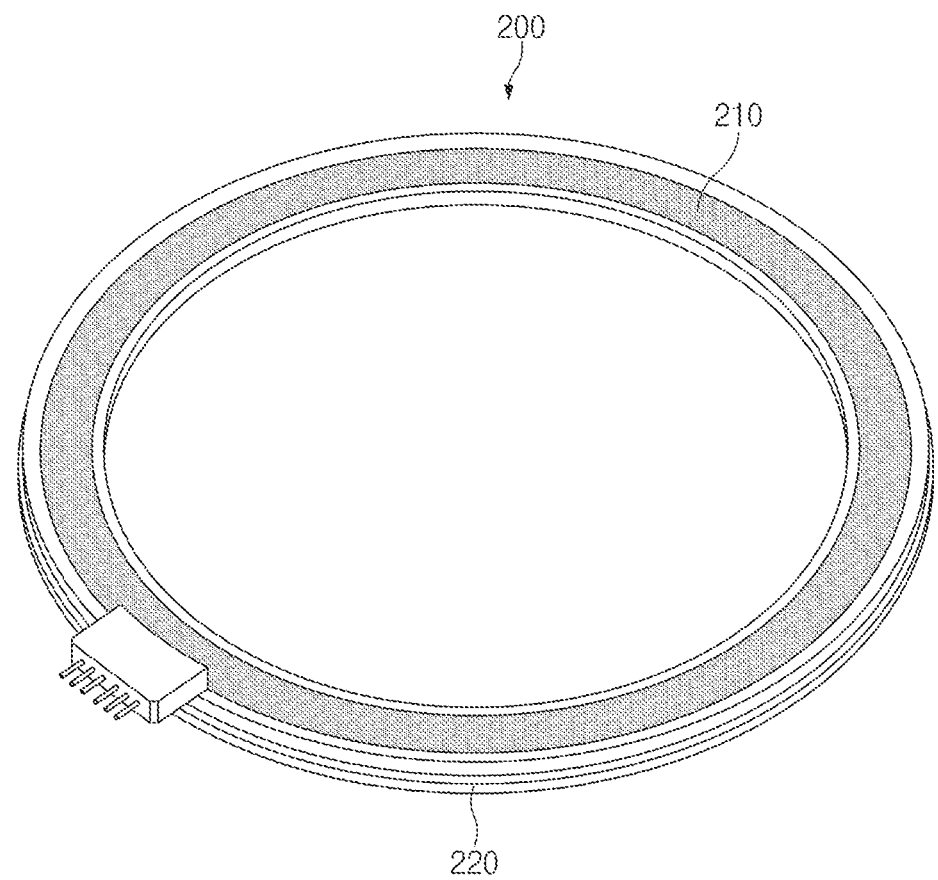
FIG. 2 is a perspective view illustrating an example of a structure of a rotation detection sensor according to the present disclosure.
Figure 3:
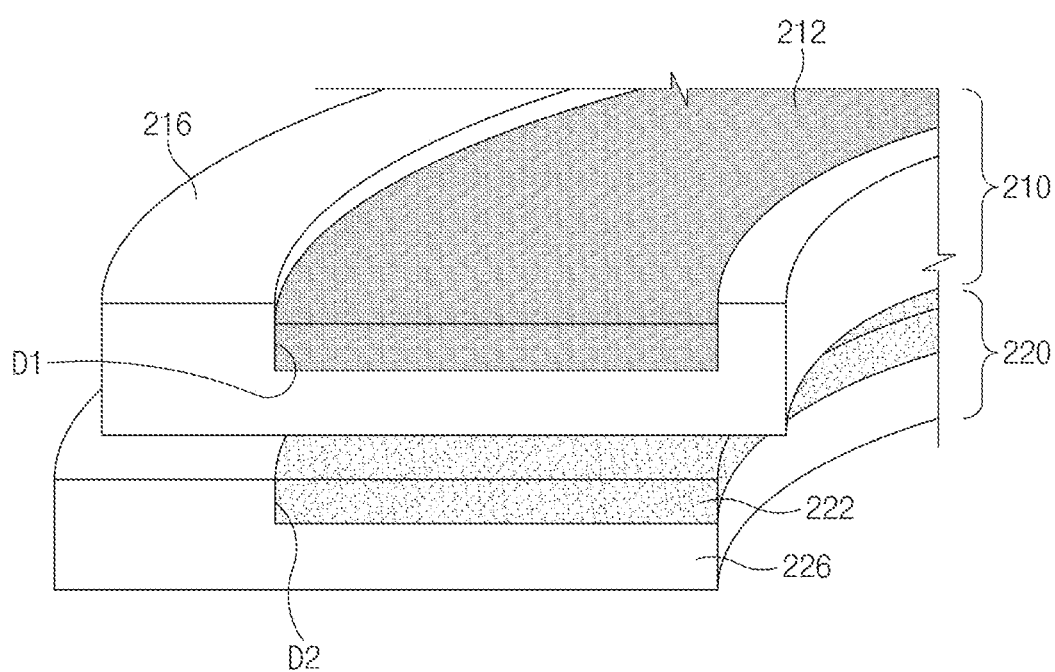
FIG. 3 is a cross-sectional view illustrating a cross-sectional structure of the rotation detection sensor of FIG. 2.

FIG. 2 is a perspective view illustrating an example of a structure of a rotation detection sensor according to the present disclosure, and FIG. 3 is a cross-sectional view illustrating a cross-sectional structure of the rotation detection sensor of FIG. 2.

As illustrated in FIGS. 1 and 2, the rotation detection sensor 200 may include a sensor stator 210 and a sensor rotor 220. Here, as illustrated in FIG. 1, the sensor stator 210 may be coupled to the outer race 140, and the sensor rotor 220 may be coupled to the hub 110. Also, as the sensor rotor 220 is coupled to the hub 110, at least a portion of the sensor rotor 220 may be provided in a space formed between the hub 110 and the outer race 140. Also, the sensor stator 210 and the sensor rotor 220 may be provided in an area on the opposite side from an area in which the first rolling body 122 faces the second rolling body 124 in the axial direction A.

Also, the sensor stator 210 and the sensor rotor 220 may be spaced apart from each other in the axial direction A of the hub 110. Thus, the sensor stator 210 and the sensor rotor 220 may be provided such that main planes of the sensor stator 210 and the sensor rotor 220 face each other. Here, the main plane may represent a surface that occupies the greatest area among the circumferential surfaces in the sensor stator or the sensor rotor.

Also, the sensor stator 210 according to the present disclosure may include a printed circuit board (PCB) substrate 212. Here, a coil pattern made of a metal material may be formed on the PCB substrate 212.

In terms of reduction in volume and weight, the rotation detection sensor according to the present disclosure has a significant difference from the resolver sensor according to the related art.

That is, in the resolver sensor according to the related art, a resolver stator has a structure in which an excitation coil and an output coil are attached to a steel sheet. Accordingly, the volume and weight of the resolver sensor becomes significantly increased.

However, the sensor stator of the rotation detection sensor according to the present disclosure has a structure in which the coil pattern significantly lighter and smaller compared to the related art is provided on the PCB substrate significantly lighter than the steel sheet. Thus, a package configuration of the in-wheel working device including the sensor for sensing the operation of the motor may be significantly facilitated, and the weight of the in-wheel working device may also be significantly reduced.

Also, as illustrated in FIG. 3, the sensor stator 210 may further include a stator housing 216 that accommodates the PCB substrate 212 of the sensor stator 210. The stator housing 216 is a component for protecting the PCB substrate 212, and thus the PCB substrate 212 may be protected from an external impact by the stator housing 216. For example, the stator housing 216 may be made of a flexible material having an elastic force and capable of absorbing the external impact. However, the sensor stator 210 may not include the stator housing 216.

Referring to FIG. 3 in more detail, a recess portion having a concavely recessed shape may be provided in the stator housing 216. For example, as illustrated in FIG. 3, a recess portion D1 having a concavely recessed shape is provided in a surface (the top surface of the stator housing in FIG. 3) of the stator housing 216 on the opposite side from a surface of the stator housing 216 facing the sensor rotor 220 among both surfaces of the stator housing 216. Also, the PCB substrate 212 provided in the sensor stator 210 may be accommodated in the recess portion D1.

Figure 4:
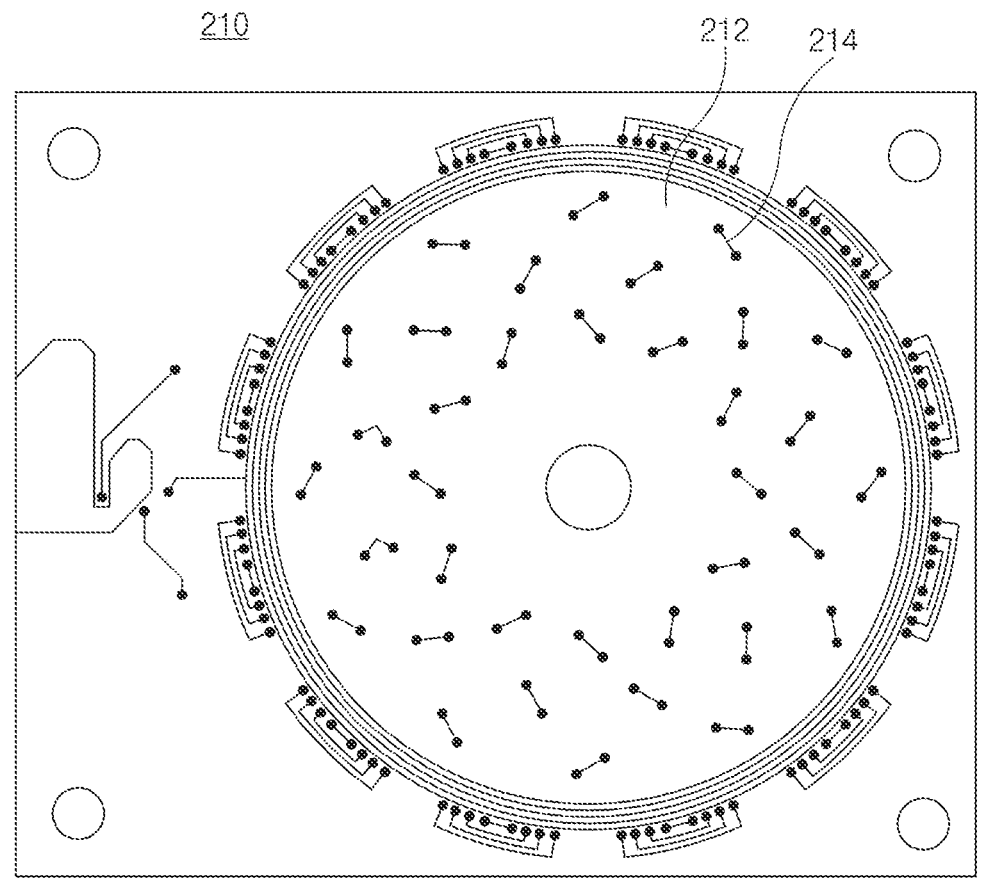
FIG. 4 is a plan view illustrating an example of a structure of a sensor stator of a rotation detection sensor according to the present disclosure.
Figure 5:
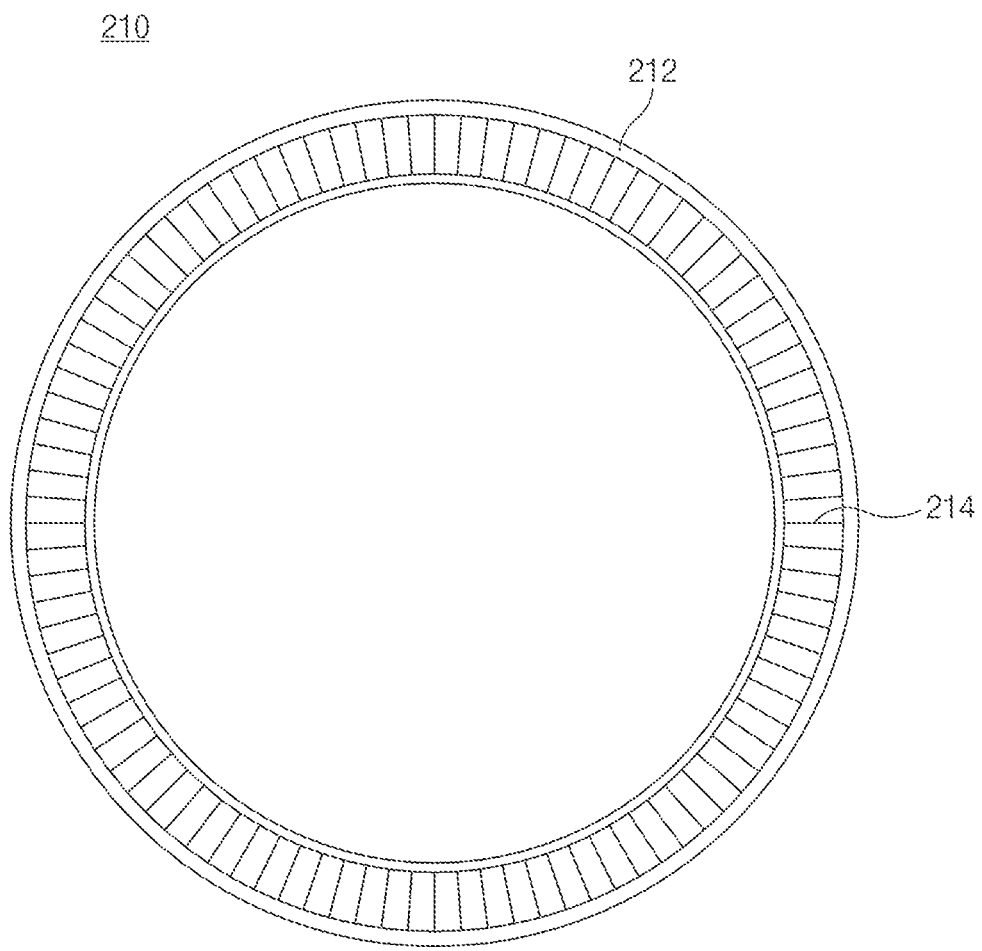
FIG. 5 is a plan view illustrating another example of a structure of a sensor stator of a rotation detection sensor according to the present disclosure.

FIG. 4 is a plan view illustrating an example of a structure of a sensor stator of a rotation detection sensor according to the present disclosure, and FIG. 5 is a plan view illustrating another example of a structure of a sensor stator of a rotation detection sensor according to the present disclosure.

As described above, a coil pattern 214 made of a metal material may be formed on a surface of a PCB substrate 212 of a sensor stator 210. Here, as illustrated in FIG. 4, the coil pattern 214 may have a pattern repeated in a circumferential direction of the PCB substrate 212. FIG. 4 illustrates, as one example, a state in which the coil pattern 214 is repeatedly formed, according to a certain rule, on areas except for a central area of the PCB substrate 212.

On the other hand, as illustrated in FIG. 5, a coil pattern 214 may include a plurality of line segment patterns that extend in a radial direction of the PCB substrate 212. In this case, the plurality of line segment patterns may be formed at equal intervals.

Figure 6:
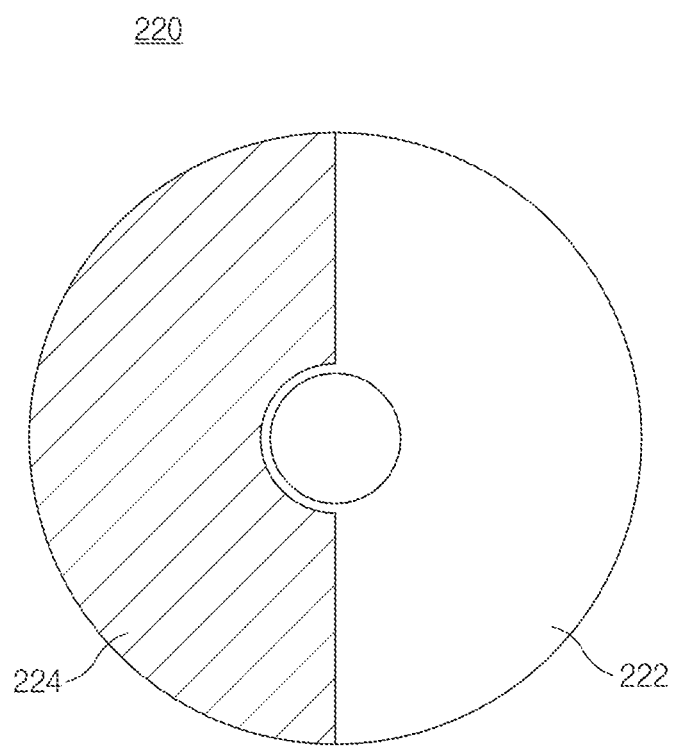
FIG. 6 is a plan view illustrating an example of a structure of a sensor rotor of a rotation detection sensor according to the present disclosure.
Figure 7:
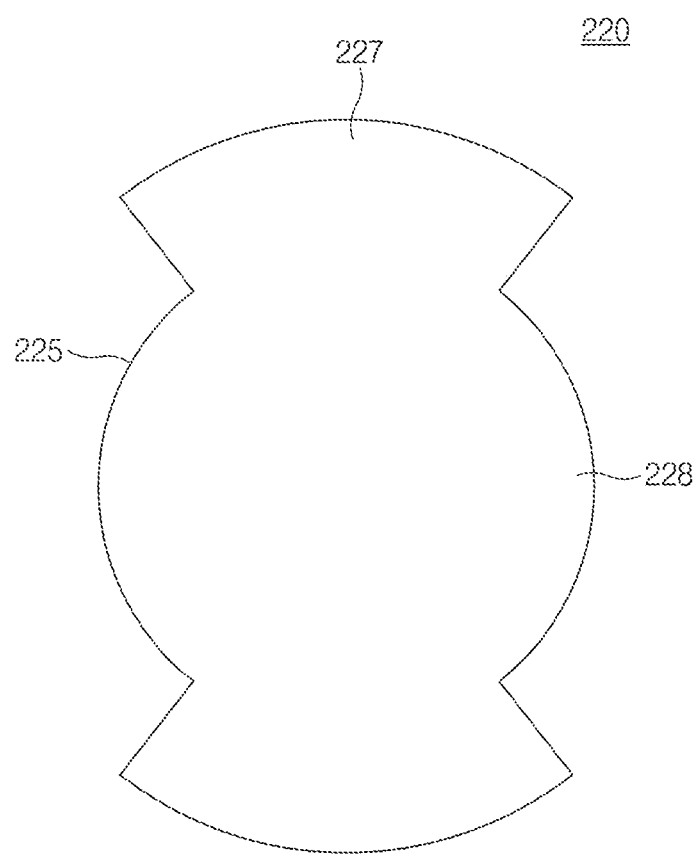
FIG. 7 is a plan view illustrating another example of a structure of a sensor rotor of a rotation detection sensor according to the present disclosure.

FIG. 6 is a plan view illustrating an example of a structure of a sensor rotor of a rotation detection sensor according to the present disclosure, and FIG. 7 is a plan view illustrating another example of a structure of a sensor rotor of a rotation detection sensor according to the present disclosure.

As illustrated in FIGS. 2, 3, and 6, the sensor rotor 220 may include a PCB substrate 222 and a metal layer 224 which is attached to a surface of the PCB substrate 222, which faces the sensor stator 210, among both surfaces of the PCB substrate 222 provided in the sensor rotor 220.

Here, as illustrated in FIG. 6, the metal layer 224 may be attached to a portion of the surface of the PCB substrate 222, which faces the sensor stator 210, among both the surfaces of the PCB substrate 222 provided in the sensor rotor 220. FIG. 6 illustrates a case where the metal layer 224 is attached to one half of the surface of the PCB substrate 222.

However, unlike the above case, a sensor rotor 220 may include a metal plate 225 as illustrated in FIG. 7. Here, as illustrated in FIG. 7, protrusion areas 227 protruding in the radial direction of the metal plate 225 and recess areas 228 concavely recessed in the radial direction of the metal plate 225 may be alternately provided in an outer circumferential surface of the metal plate 225 in the radial direction. FIG. 7 illustrates that two of the protrusion areas 227 and two of the recess areas 228 are provided in the metal plate 225 of the sensor rotor 220. Here, the metal plate 225 of the sensor rotor 220 may be made of an electrical steel sheet or aluminum.

Here, referring to FIG. 3 again, the sensor rotor 220 may further include a rotor housing 226 that accommodates the metal layer 224 (see FIG. 6) and the PCB substrate 222 provided in the sensor rotor 220. Similar to the stator housing 216, the rotor housing 226 may also be a component for protecting the PCB substrate 222 provided in the sensor rotor 220. For example, the rotor housing 226 may be made of a flexible material having an elastic force and capable of absorbing the external impact. However, the sensor rotor 220 may not include the rotor housing 226.

Referring to FIG. 3 in more detail, a recess portion having a concavely recessed shape may be provided in the rotor housing 226. For example, as illustrated in FIG. 3, a recess portion D2 having a concavely recessed shape is provided in a surface (the top surface of the rotor housing in FIG. 3) of the rotor housing 226 facing the sensor stator 210 among both surfaces of the rotor housing 226. Also, the PCB substrate 222 provided in the sensor rotor 220 may be accommodated in the recess portion D2.

Automobile

An automobile according to the present disclosure may include the in-wheel working device 10. The description of the in-wheel working device is replaced with the above description.

According to the present disclosure, the package configuration of the in-wheel working device of the automobile may be facilitated by reducing the volume and weight occupied by the sensor mounted to control the motor in the in-wheel working device.

Although the present disclosure has been described with specific embodiments and drawings, the present disclosure is not limited thereto, and it is obvious that various changes and modifications may be made by a person skilled in the art to which the present disclosure pertains within the technical idea of the present disclosure and equivalent scope of the appended claims.

What is claimed is:

1. An in-wheel working device comprising:
  a wheel bearing comprising a hub that constitutes a body; and
  a rotation detection sensor coupled to the wheel bearing,
  wherein the wheel bearing comprises:
    an inner race coupled to an outer circumferential surface of the hub in a radial direction (R);
    an outer race spaced outward from the inner race in the radial direction (R); and
    a rolling body provided between the inner race and the outer race or between the hub and the outer race,
  wherein the rotation detection sensor comprises:
    a sensor stator coupled to the outer race; and
    a sensor rotor coupled to the hub,
  wherein the sensor stator comprises
    a printed circuit board (PCB) substrate having a surface on which a coil pattern made of a metal material is formed, and
  wherein the sensor stator and the sensor rotor are spaced apart from each other in an axial direction (A) of the hub.

2. An in-wheel working device comprising:
  a wheel bearing comprising a hub that constitutes a body; and
  a rotation detection sensor coupled to the wheel bearing,
  wherein the wheel bearing comprises:
    an inner race coupled to an outer circumferential surface of the hub in a radial direction (R);
    an outer race spaced outward from the inner race in the radial direction (R); and
    a rolling body provided between the inner race and the outer race or between the hub and the outer race,
  wherein the rotation detection sensor comprises:
    a sensor stator coupled to the outer race; and
    a sensor rotor coupled to the hub,
  wherein the sensor stator comprises
    a printed circuit board (PCB) substrate having a surface on which a coil pattern made of a metal material is formed, and
  wherein the coil pattern comprises a plurality of line segment patterns extending in a radial direction of the PCB substrate.

3. The in-wheel working device of claim 1, wherein the coil pattern comprises a pattern repeated in a circumferential direction of the PCB substrate.

4. The in-wheel working device of claim 1, wherein the sensor stator further comprises a stator housing configured to accommodate the PCB substrate of the sensor stator.

5. The in-wheel working device of claim 4, wherein a recess portion having a concavely recessed shape is formed in a surface of the stator housing on the opposite side from a surface of the stator housing facing the sensor rotor among two opposing surfaces of the stator housing in an axial direction (A) of the hub, and
  the PCB substrate provided in the sensor stator is accommodated in the recess portion.

6. An in-wheel working device comprising:
  a wheel bearing comprising a hub that constitutes a body; and
  a rotation detection sensor coupled to the wheel bearing,
  wherein the wheel bearing comprises:

an inner race coupled to an outer circumferential surface of the hub in a radial direction (R);

an outer race spaced outward from the inner race in the radial direction (R); and a rolling body provided between the inner race and the outer race or between the hub and the outer race, wherein the rotation detection sensor comprises:

a sensor stator coupled to the outer race; and a sensor rotor coupled to the hub, wherein the sensor stator comprises a printed circuit board (PCB) substrate having a surface on which a coil pattern made of a metal material is formed, and wherein the sensor rotor comprises:

a PCB substrate; and a metal layer which is attached to a surface of the PCB substrate, which faces the sensor stator, among both surfaces of the PCB substrate provided in the sensor rotor.

7. The in-wheel working device of claim 6, wherein the metal layer is attached to a portion of the surface of the PCB substrate, which faces the sensor stator, among both the surfaces of the PCB substrate provided in the sensor rotor.

8. The in-wheel working device of claim 6, wherein the sensor rotor further comprises a rotor housing configured to accommodate the PCB substrate provided in the sensor rotor.

9. The in-wheel working device of claim 8, wherein a recess portion having a concavely recessed shape is formed in a surface of the rotor housing facing the sensor stator among two opposing surfaces of the rotor housing in an axial direction (A) of the hub, and the PCB substrate provided in the sensor rotor is accommodated in the recess portion.

10. The in-wheel working device of claim 1, wherein the sensor rotor comprises a metal plate, and protrusion areas protruding in a radial direction of the metal plate and recess areas concavely recessed in the radial direction of the metal plate are alternately provided in an outer circumferential surface of the metal plate in the radial direction.

11. The in-wheel working device of claim 10, wherein the metal plate is made of an electrical steel sheet or aluminum.

12. An automobile comprising the in-wheel working device of claim 1.

* * * * *